United States Patent [19]

Gray

[11] Patent Number: 4,578,761

[45] Date of Patent: Mar. 25, 1986

[54] SEPARATING AN EQUIVALENT CIRCUIT INTO COMPONENTS TO DETECT TERMINATING NETWORKS

[75] Inventor: Michael A. Gray, Parsippany, N.J.

[73] Assignee: AT&T Bell Laboratories, Murray Hill, N.J.

[21] Appl. No.: 478,877

[22] Filed: Mar. 25, 1983

[51] Int. Cl.[4] .............................................. G06F 11/00
[52] U.S. Cl. ..................................... 364/481; 364/579
[58] Field of Search ....................... 364/481, 579–580, 364/300; 324/51

[56] References Cited

U.S. PATENT DOCUMENTS

| | | | |
|---|---|---|---|
| 3,393,301 | 7/1968 | Valstar | 364/579 X |
| 3,920,973 | 11/1975 | Avellar et al. | 364/579 |
| 3,976,893 | 8/1976 | Banfi | 364/579 X |
| 3,983,377 | 9/1976 | Vitins | 364/481 |
| 4,402,055 | 8/1983 | Lloyd et al. | 364/579 |

OTHER PUBLICATIONS

Locating Cable Faults, C. A. Maloney, IEEE Transactions on Industry Applications, Jul./Aug. 1973; pp. 380–394.

Primary Examiner—Edward J. Wise
Attorney, Agent, or Firm—John T. Peoples; Robert O. Nimtz; Patrick E. Roberts

[57] ABSTRACT

A methodology for decomposing a three-wire equivalent circuit into a cascade arrangement of a two-wire transmission line and a three-port terminating network is disclosed. Decomposition synthesis is accomplished by iteratively separating the equivalent circuit into the two component parts according to a predetermined algorithm and then comparing the derived three-port network to each network within a class requiring identification, thereby effecting an identification whenever a match occurs. Upon a matched condition, the resistance of the transmission line corresponds to the distance to the terminating network and may be used for fault diagnosis purposes.

3 Claims, 3 Drawing Figures

SEPARATING AN EQUIVALENT CIRCUIT INTO COMPONENTS TO DETECT TERMINATING NETWORKS

FIELD OF THE INVENTION

This invention relates generally to identifying networks terminating a multipair cable and, more particularly, to methodology for correcting perturbations in measurements due to unknown electrical lengths of the conductors comprising the cable.

BACKGROUND OF THE INVENTION

In the subscriber loop motion of telecommunication systems, shielded-pair cable is the predominant medium utilized for signal propagation. The cable generally comprises numerous conductor pairs encompassed within a nonconductive sheath; the sheath also contains a continuous metallic shield so the cable may be grounded periodically to mitigate interference. The conductors of a pair are generally known as the tip and ring conductors. The tip and ring, together with circuit ground, constitute a three-wire transmission line utilized for signaling and testing purposes. Typically each pair connects customer equipment to a switching point, usually a central office, or groupings of pairs called trunks connect switching points.

During the course of usage of telephone equipment by a customer, situations occur wherein a telephone receiver is inadvertently removed from the switchhook, a condition referred to as a ROH (receiver-off-hook) fault. As a service to the customer, in certain central offices, an audible signal is temporarily connected at the central office to the pair serving the customer so as to alert the customer of a ROH. This signal is placed on the loop after loop current flows and no digits are dialed within about sixty seconds. After the audible signal is removed, the pair is connected to central office circuitry designated a permanent signal holding network. It is also well-known that other conditions, such as low tip-ring resistance caused by a fault, are also interpreted as a ROH condition by the central office.

A typical holding network applies a resistance (which may be zero) to the tip conductor, a battery in series with a resistance to the ring conductor and, usually, a 500 Hz tone ring-to-ground. The characteristics of the holding network for each particular central office type are referred to as its signature.

Oftentimes it is necessary to test a subscriber loop to determine if faults exist or if preventive maintenance is required. These tests are usually performed over a test trunk pair from a remote location having a controller and associated test equipment. When a loop is accessed by a very short test trunk (essentially zero resistance), then the signature of the holding circuit closely matches the actual measurements on the three-port network comprising the tip and ring conductors and ground. This affords a simple detection of a permanent signal condition so that additional tests may be planned and performed.

However, if a test trunk is electrically long, then the three-port equivalent circuit derived from measurements at the test point may depart substantially from the signature. In fact, the terminating network characteristics may be so completely obfuscated that the network is not identifiable. This distortion may result in improper fault diagnosis, incorrect selection of follow-up measurement; strategies, or even false dispatches of repair forces.

One technique to counteract this deleterious effect is to utilize calibrated trunks. For instance, the trunk resistance may be measured periodically and the equivalent circuit interpreted in view of this known resistance. However, for certain holding networks, small errors in the trunk resistance due, for example, to measurement inaccuracies or changing ambient conditions, are magnified so that the results are still misinterpreted.

The foregoing focused on holding networks placed on a loop in the central office and measurements over an electrically long turnk circuit. A similar interpretation problem exists whenever loop measurements are made at the central office to detect conductor-to-ground conditions along the loop. For instance, a coin telephone has unique three-port network characteristics in its different operating modes. In these situations, the unknown resistance is the loop resistance between the central office and the network connection point. It is not practical to calibrate the loop so direct interpretation of results is extremely difficult.

SUMMARY OF THE INVENTION

The shortcomings and deficiencies of conventional techniques to compensate for unknown electrical lengths are obviated, in accordance with the present invention, by an improved method that separates an equivalent circuit into component parts so specific types of terminating networks may be identified.

Broadly speaking, the method of the preferred embodiment commences by synthesizing a delta equivalent network representative of the three-wire line comprising tip, ring and ground as derived from measurements at the test point. A delta-wye transformation is then performed, and the series arms of the wye are modified according to a predetermined algorithm. After each modification, a wye-delta transform yields a new delta for comparison to the class of network signatures under consideration. When the comparison falls within prescribed limits, it is indicated that the terminating network has been properly identified. The portion of the series arms removed prior to the wye-delta transform provides a measure of the distance to the terminating network from the measurement point and is useful for fault location diagnosis.

The organization and operation of this invention will be better understood from a consideration of the detailed description of an illustrative embodiment thereof, which follows, when taken in conjunction with the accompanying drawing.

DETAILED DESCRIPTION

Figure 1:
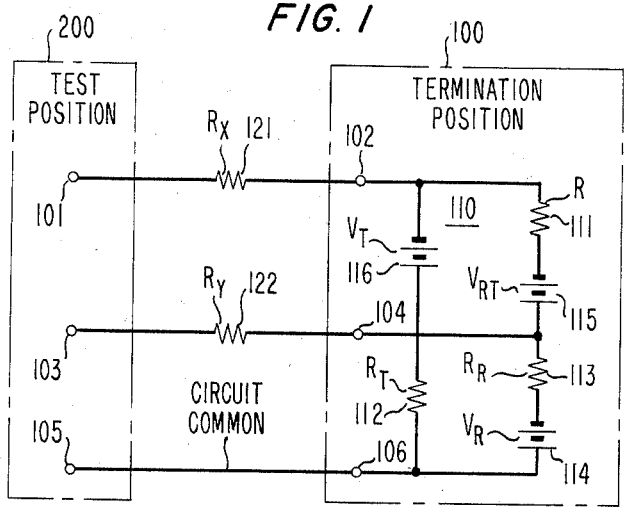
FIG. 1 is a general representation of a delta network coupling the tip-ring, tip-ground and ring-ground paths at a termination point along the span of the cable pair under test.

A three-wire transmission line, comprising TIP conductor with terminal nodes 101 and 102, RING conductor with terminal nodes 103 and 104 and CIRCUIT COMMON with nodes 105 and 106, is shown in FIG. 1 as connecting a test position 200 and remotely-located termination position 100. The DC resistance $R_X$ of the TIP conductor between positions 100 and 200 is represented by resistor 121; similarly, resistor 122 designates the RING resistance $R_Y$ between these same two positions. In most situations $R_X$ is substantially the same as $R_Y$.

Delta network 110, comprising TIP-RING resistance R (resistor 111) in series with DC source $V_{RT}$ (battery 115), TIP-COMMON resistance $R_T$ (resistor 112) in series with DC source $V_T$ (battery 116) and the series combination of resistance $R_R$ and DC source $V_R$ (resistor 113 and battery 114, respectively) in the RING-COMMON path, terminates the three-wire line at position 100. This DC delta network is representative of the class of permanent signal holding networks requiring identification. Moreover, if DC sources $V_R$, $V_T$ and $V_{RT}$ are set to zero, then the delta network represents other passive networks which may terminate a loop, such as a coin telephone, and which also require identification. This DC delta representation of a network is its DC signature.

Figure 2:
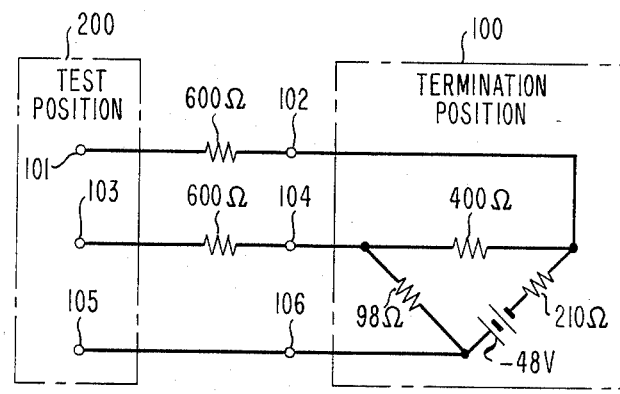
FIG. 2 is a representation of a particular delta network for the claims of terminating networks requiring identification.
Figure 3:
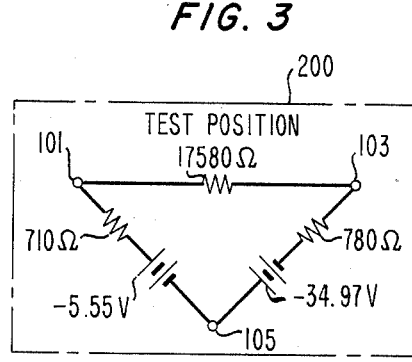
FIG. 3 is a three-wire equivalent circuit of the arrangement of FIG. 2 as derived from measurement at the test position.

Measurements to actually identify delta network 110 are effected at test position 200. If $R_X$ and $R_Y$ are zero, then the TIP-RING pair is transparent and a three-wire equivalent circuit as derived from measurements at position 200 is essentially equal to the particular delta network 110 under consideration. However, for finite $R_X$ and $R_Y$, the three-wire equivalent at position 200 differs from delta network 110. For example, the delta network shown in FIG. 2 as terminating a 600 ohm test trunk has the three-wire equivalent circuit representation depicted in FIG. 3. The distortion caused by the interposed test trunk resistance is apparent when FIGS. 2 and 3 are compared. Normal tolerances in identifying a permanent signal network call for a TIP-RING resistance of less than 10,000 ohms and a DC voltage on the RING between $-36$ V and $-75$ V. Thus, even with these rather broad limits, the 600 ohm resistance of each conductor effectively masks the holding network DC signature. In fact, with conventional procedures, the equivalent circuit suggests two loop faults, namely, a low TIP-RING resistance and a foreign voltage on the TIP conductor.

For the class of circuits to be identified, it is known that the delta network is embedded in the three-wire equivalent circuit and is buffered by the series resistance of the TIP and RING conductors. Thus, it is possible to decompose the equivalent circuit into its component parts, as depicted generally by FIG 1. Once the decomposition is effected, each terminating network in the class requiring identification is compared to the derived delta network. If a match exists to any network in the class within prescribed limits, it is presumed a proper identification has been effected.

In accordance with an illustrative embodiment of the invention, one decomposition synthesis includes the steps of: (i) transforming the three-wire equivalent network derived from the measurements to a wye network; (ii) apportioning each series arm of the wye into a conductor resistance part and a remainder portion; (iii) performing a wye-delta transform on the wye comprising the remainder portions and the shunt arm to derive a new delta; and (iv) comparing the derived delta to each network to be identified. If no match exists as a result of step (iv), steps (ii) through (iv) are repeated until a match occurs or a preselected number of iterations are exceeded. With regard to the apportioning step, many techniques may be utilized. One straightforward procedure is to presume upper and lower limits on series resistance of the TIP and RING conductors, and then performs a binary search to converge to a potential solution. Other wellknown search techniques may be utilized that effect more rapid convergence. Moreover, rather than perform a delta-wye followed by a wye-delta transform, other realizations of this invention minimize an objective function with constraints. The objective function is defined in terms of the general network structures depicted by FIGS. 1 and 3, and the constraints are in terms of the values of resistances 111, 112 and 113 as well as source 114 for each terminating network in the class.

The following pseudocode summarizes the method for the application of the binary search technique:

```
test = L           /*series arm resistance granularity*/
serlo = X          /*lower limit of series resistance*/
serhi = Y          /*upper limit of series resistance*/
mod = (X+Y)/2      /*starting resistance of search*/
rhibat = -VRH      /*ring high battery limit*/
rlobat = -VRL      /*ring low battery limit*/
thibat = VTH       /*tip high battery limit*/
tiprng = R         /*tip-to-ring comparison resistance*/
while   (serhi - serlo > test) {
   adjust wye arms by mod;
   if (any delta resistance negative OR
       ring side battery < rhibat OR
       tip side battery > thibat) {
      serhi = mod;
      mod = (serhi + serlo)/2;
      continue;
   }
   if (ring side battery > rlobat OR
       tip-to-ring resistance > tiprng) {
      serlo = mod;
      mod = (serhi + serlo)/2;
      continue;
   }
   if (signature matches known network m) {
      return (m);
   }
   otherwise, not a known network
}
```

As an aid to interpreting results in those few situations wherein application of the method yields similar signatures, such as a permanent signal caused by a solid ground on the RING versus a TIP-RING short, the method may be augmented by additional testing. For instance, if a permanent signal condition is caused by a TIP-RING short, then the TIP registers an appreciable negative voltage at test position 200. This is in contrast to the solid ground situation wherein the TIP voltage is negligible. This supplemental testing, which is performed prior to the three-wire measurements and is referred to as pre-screening, provides an improved decomposition algorithm.

It is to be further understood that the decomposition process described herein is not limited to the specific forms by way of example and illustration, but may assume other embodiments limited only by the scope of the appended claims.

What is claimed is:

1. A method for decomposing a derived three-mode equivalent circuit into first and second components, wherein said second component is a delta network from a class of terminations, said method comprising the steps of apportioning said equivalent circuit into a segment representative of said first component and a delta circuit corresponding to said second component according to a partitioning algorithm, and comparing each delta network in said class to said delta circuit until either a match occurs within preselected bounds or for a predetermined number of times returning to said step of partitioning.

2. A method for identifying a delta network in a class of transmission line terminations from three-wire measurements performed on said line and circuit common at a test position along said line, said method comprising the steps of generating a three-port equivalent circuit indicative of said measurements, partitioning said equivalent circuit into a segment representative of said line and a delta circuit terminating said line according to a prescribed algorithm, and comparing each delta network in said class to said delta circuit until either a match occurs within predetermined limits or for a predetermined number of times returning to said step of partitioning.

3. The method as recited in claim 2 wherein said step of generating further comprises the step of applying a set of independent test signals at said test position and the step of measuring the corresponding responses on said line.

* * * * *